T

July 22, 1969 AKIRA KAWAJI 3,457,468

OPTICAL SEMICONDUCTOR DEVICE

Filed Sept. 10, 1965

INVENTOR.
AKIRA KAWAJI

BY
Hopgood & Calimafde
ATTORNEYS.

United States Patent Office 3,457,468
Patented July 22, 1969

3,457,468

OPTICAL SEMICONDUCTOR DEVICE

Akira Kawaji, Tokyo, Japan, assignor to Nippon Electric Company, Limited, Tokyo, Japan, a corporation of Japan Filed Sept. 10, 1965, Ser. No. 486,492
Claims priority, application Japan, Sept. 10, 1964, 39/51,657
Int. Cl. H01l 3/00, 15/00
U.S. Cl. 317—234 16 Claims

ABSTRACT OF THE DISCLOSURE

An optical semiconductor device is described wherein a semiconductor junction is formed between semiconductor regions of opposite conductivity with the junction located between a pair of substantially parallel optical reflecting surfaces. A rectifying-barrier-forming electrode is positioned in the laser path formed when the junction is subjected to a large laser-inducing current. A reverse biasing potential is applied across the barrier which results in a reverse current which may be varied by the lasing action of the junctions. Alternately, a mechanism is described wherein the laser function is controlled by a variation of the reverse biasing voltage across the barrier, since the electric field produced by this biasing voltage produces an electrostrictive effect that influences the laser function of the device. Several embodiments are shown.

This invention relates to optical semiconductor devices, and more particularly to such devices which include a light-emitting junction therein and which are capable of producing amplification and oscillation.

It is an object of the invention to provide an improved optical seminconductor amplifying device.

Another object of the invention is to provide a semiconductor device having significantly improved operating characteristics.

Figure 1:
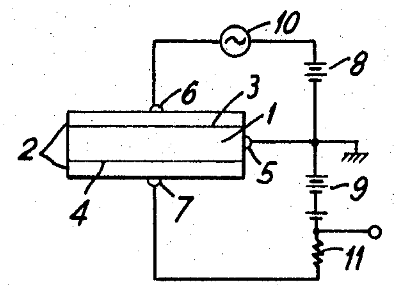
FIG. 1 (PRIOR ART)
Figure 2:
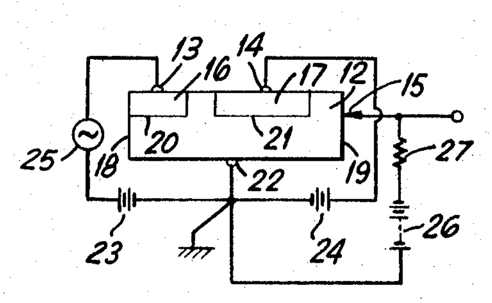
Figure 6:
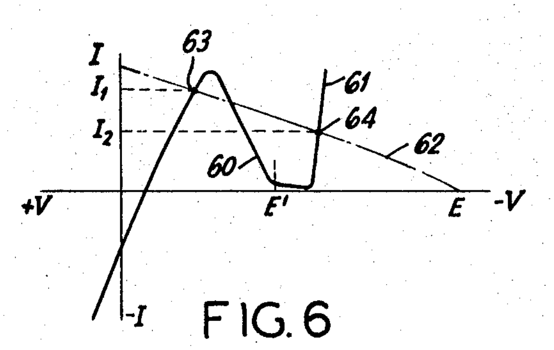
Figure 3:
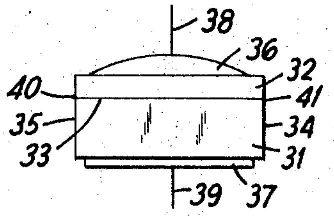
FIG. 3 (PRIOR ART)
Figure 7:
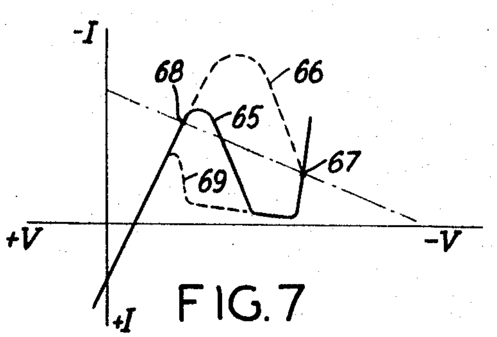
Figure 4:
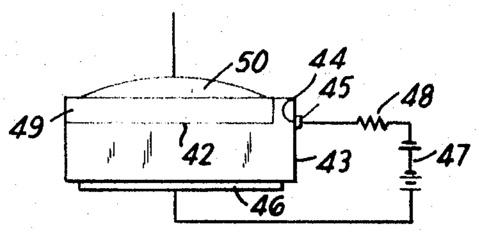
Figure 8:
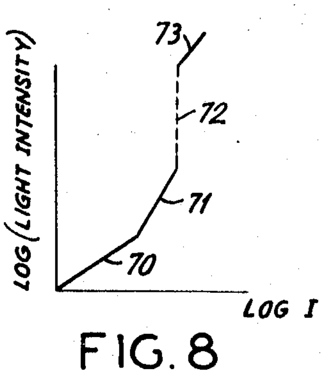
Figure 5:
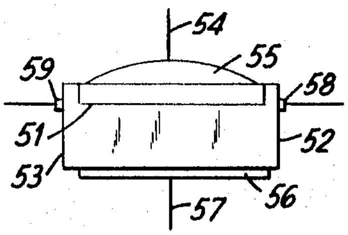

All of the objects, features and advantages of this invention and the manner of attaining them will become more apparent and the invention itself will be best understood by reference to the following description of an embodiment of the invention taken in conjunction with the accompanying drawing, in which:

FIG. 1 is a conventional optical semiconductor amplifying device,

FIG. 2 shows an optical semiconductor amplifying device in accordance with the present invention, FIG. 3 shows a conventional semiconductor laser device, FIGS. 4 and 5 show optical laser-type semiconductor devices in accordance with the present invention, FIGS. 6 and 7 show the negative resistance characteristics of the optical semiconductor devices of FIGS. 4 and 5, and FIG. 8 shows the relationship between the exciting current and intensity of the emerging light.

The optical transistor, as those knowledgeable in the art are aware, is also conventionally known as an optical semiconductor amplifying device. In such a transistor, a semiconductor light emitting junction of high efficiency can be formed, using gallium arsenide, indium arsenide or the like, two opposed junctions portions being employed therein. In FIG. 1 an N-type gallium arsenide semiconductor body 1 has P-type diffused regions 2 which form PN junctions 3 and 4 between these portions and the remaining portion of the body 1. A forward bias is applied by a battery 8 between the electrodes 5 and 6, and a reverse bias is applied between the electrodes 5 and 7, by a battery 9. In such a configuration forward current flows through the junction 3, so that this junction emits light with a high efficiency. A part of the light reaches the junction 4, increasing the reverse current thereof. If an input signal current is superimposed on the current through the junction 3, by using an input signal source 10, the light generated at the junction 3 is modulated by the signal and causes a fluctuation in the reverse current of the junction 4 when the light reaches this latter junction, generating a voltage across a load resistor 11. If a sufficient degree of conversion efficiency is obtained, a power gain can be obtained owing to the impedance ratio between the impedances of the junction 4 and the junction 3, when the latter has a sufficiently low impedance compared with the former.

Although this is well known to those skilled in the art, there are serious drawbacks. Thus, since the structure of the amplifier in accordance with the conventional method is similar to a transistor using minority carriers as well known, the advantage of improving the high frequency characteristics can not be utilized except for the reduction in the signal carrier transit time. On the other hand, in the present state of the art, the diffused transistor has been developed to such a stage that factors such as the emitter capacitance, base resistance, and collector capacitance other than the signal carrier transit time are of more importance. A still more series problem is that the current-light conversion efficiency of the high efficiency light emitting junction is of the order of only 10%. Accordingly, it will be seen that the current amplification factor cannot approach 1, even if the junction 4 should provide a multification effect. Further, the response of the conversion between current and light is especially important at high frequencies such as in the gigacycle range. In the conventional amplifier, however, the light emitted from the junction 3 is spontaneous, and its rise time is approximately 2 nanoseconds. It is thus apparent that difficulties will be encountered in using the amplifier in the aforementioned frequency range.

The present invention eliminates the above disadvantages of the conventional amplifier, as well as providing an amplifier having a sufficient gain in the centimeter wave range, and using the coherent light as the signal carrier.

One optical amplifier in accordance with the present invention is shown in FIG. 2, and has a semiconductor substrate 12 with a light emitting electrode 13, a light amplifying electrode 14, and a point contact or small area electrode 15. As an example, N-type gallium arsenide containing $3\times10^{18}$/cc. of tellurium as the semiconductor substrate 12 may have P-type regions 16 and 17 as a result of selective diffusion of zinc using a silicon dioxide film. A pair of opposed sides 18 and 19 are formed perpendicular to junctions 20 and 21, and are flat and smooth, forming an optical resonator with the semiconductor substrate 12, and are used as reflectors. The side 19 does not include a P-type region. The electrode 15 of point contact, deposited conducting material, or microalloy, is formed at a proper location on the side 19. This contact electrode may be that which forms the so-called Schottky barrier. As will become clear later in the specification, the proper location referred above is the region of initial coherent light reflection on the side 19.

In the circuit of FIG. 2 a positive voltage is applied by a battery 23 across the light emitting electrode 12 and substrate electrode 22, the latter being a non-rectifying contact, and another positive voltage is applied by a battery 24 across the optical amplifying electrode 14 and substrate electrode 22. If the current flowing through the junctions 20 and 21 is sufficiently high, the horizontal component, along the junction, of the light emitted by the junctions 20 and 21 is repeatedly reflected at the sides 18 and 19, this light being amplified and eventually resulting in oscillation. The coherent light thus emerges from the sides 18 and 19 to the outside of the semiconductor. If the current density of the junction 20 is sufficiently higher than that of the junction 21, the wave length of the coherent light is determined by the light emission characteristics of the junction 20, and junction 21 acts mainly as an amplifier of the coherent light emitted by the junction 20.

If an input signal source 25 is superposed to the positive direct current due to the battery 23 as shown in FIG. 2, the light emitted by the junction 20 is modulated by the signal source 25 and amplified when it passes the junction 21.

The electrode 15 is located on the side 19 at such a point that the coherent light is emitted and reflected, or in other words is located on the line which the plane including the bottom surface of the junction 21 cuts on the side 19. It is known that there is on the semiconductor laser junction a particularly efficient point at which the oscillation initiates if the current is increased. Hence it is desirable to form the electrode 15 on the side 19 at such a point where the initial coherent light is reflected and emitted, because the coherent light in such a structure is concentrated in the vicinity of the point contact, the current amplification factor being high.

As shown in FIG. 2, a reverse voltage is applied across the point contact electrode 15 and substrate electrode 22 by a battery 26 through a load resistor 27. The reverse resistance of a point contact electrode formed on a semiconductor surface is in general very high because of its good rectifying characteristics. When the light is concentrated at the contact point, minority carriers are generated and cause reverse current, such generation being limited within the surface inversion layer directly under the contact point, or in the case of a Schottky barrier majority carrier injection occurs only at the surface. This is because efficient absorption in the N-type region for the laser light does not occur. This indicates that the effect of the transit time for diffusion of the minority carriers on the frequency response is negligible, because the thickness of the inversion layer is less than several hundred angstroms. On the other hand the point contact has a capacitance of the order of 0.1 pf. which is sufficiently small.

In the case of the light emitting electrode 13, the response of the stimulated emission of light to the current fluctuation of the electrode of a semiconductor laser oscillating in the coherent light is known to be less than 0.2 nanosecond. Therefore, it is able to respond to input signals in the gigacycle frequency range. As the light emitting electrode is biased in the forward direction, the differential resistance of the junction 20 is less than 1 ohm, whereas that of the point contact electrode 15 is higher than 10 megohms as aforementioned.

The current amplification factor is rather high, as the coherent light emitted at the junction 20 is amplified by the junction portion 21 of the amplifying electrode, reaches to the point contact electrode with a sufficiently high light intensity, and is converted into current fluctuaion. Hence it enables a high gain as well as the aforementioned high input output impedance ratio when operated as an amplifier.

Further embodiments of the invention will now be described with the aid of FIGS. 3–8.

Referring first to FIG. 3, there is shown a conventional semiconductor laser comprising a resonator as a whole, having in a single semiconductor crystal substrate 31, such as for example gallium arsenide, a region 32 with a conductivity type opposite to that of the substrate, and a pair of side faces 34 and 35, these being flat, smooth reflection faces and also being perpendicular to a PN junction portion 33 formed at the interface between the two regions having different conductivity types. A voltage in the positive direction is applied to the junction 33 externally across terminals 36 and 37 through extended electrodes 38 and 39, resulting in a forward current passing through the junction, and causing laser oscillation if the current density at the junction is sufficiently high, due to the stimulaed ligh emitted by the junction. It is known that the intensity of such laser oscillation or the threshold current of the oscillation is strongly affected by the variation of the characteristics of the reflection faces 34 and 35. The characteristics of the faces are dependent upon the mechanical processing during the fabrication of the element, as well as upon the external pressure or electric field. In a semiconductor crystal with a strong unisotropy, such as is exhibited by gallium arsenide, the stress due to an electric field is large, and thus suited to produce variations at the surface and the vicinity thereof. In the conventional type of semiconductor laser as shown in FIG. 3, the junction portion 33 intersects the reflection faces 34 and 35 at the points 40 and 41. Since the laser light travelling along the junction portion 33 is reflected at these points 40 and 41, the laser oscillation may be modulated, providing that variations can be applied externally to the surface at the points 40 and 41 and the vicinity thereof. It is apparent, however, that the external application of an electric field to the junction portion results in a short circuit and other undesirable effects.

The following embodiments of this invention enable control of the laser oscillation as well as negative resistance by applying an electric field to produce variations in the vicinity of the reflection face, and amplification of an electric signal without the problems referred to immediately above.

The junction portion of the laser element used in the optical semiconductor device need not necessarily intersect the reflection face. Referring to the embodiment shown in FIG. 4, the junction portion 42 does not intersect the reflection face 43 on the right, and therefore the laser light emitted from the junction portion 42 travelling to the right is reflected at a portion 44 of the face 43. A metal contact or contact electrode 45 is located on the portion or region 44 of the face 43. A local deposit of an electrically conductive film instead of the metal contact may be used for such a structure.

A voltage is applied across the metal contact 45 and a non-rectifying electrode 46 by a battery 47 in the negative direction for the rectifying characteristics of the contact. As a barrier of high resistance exists directly under the contact in the negative direction, a high electric field is created in the barrier and a mechanical strain as well as variation in the energy gap of the forbidden band results from the piezo-electric characteristics of the crystal. This causes large variations in the reflexibility of the laser light and the absorption factor in the vicinity of the reflection face, and as a result the Q of the resonator varies, the intensity of oscillation decreases generally, and the threshold current of oscillation increases .The magnitude of the strain due to the electric field is dependent on the orientation of the crystal axis; for example, with gallium arsenide the largest strain is created when an electric field is applied to the <110> orientation. Since the <110> orientation is the cleaving direction, it is useful as a reflection face. The current for laser oscillation in FIG. 4, naturally, flows in the positive direction between the electrode 50 attached to the P-type region 49 and the electrode 46.

FIG. 5 shows another embodiment in which a junction portion 51 does not intersect either reflection face 52 or 53, however, it is the same as that of FIG. 4 in that the current for laser oscillation flows through 54, 55, 56 and 57. In the FIG. 5 embodiment, however, two metal contacts 58 and 59 are formed on the reflection faces 52 and 53, respectively.

As the barrier of the contact portion of the contact points 45 in FIG. 4 is reverse biased, the incidence of the laser light creates reverse current and the potential at the contact 45 decreases drastically, if a sufficiently high load resistance 48 is connected, thus reducing the surface strain and in turn increasing the laser oscillation intensity. Then an increase in the reverse current follows. The voltage-current characteristics across the contact 45 and electrode 46 as shown by the negative resistance curve in FIG. 6. If the voltage is further increased, a breakdown phenomenon is caused at the contact point and breakdown current 61 flows. Since an N type characteristic is obtained as shown in the figure, two stable operating points 63 and 64 exist as in a normal N type negative resistance element. if the source voltage 47 of FIG. 4 is E and the load resistance is as expressed by the broken line 62. The current through the electrode 45 can jump from the current $I_1$ corresponding to the intersection 63 to the current $I_2$ corresponding to the intersection 64, these intersection points being formed by the intersection of the characteristic curve 61 with the load resistance line 62. It can also jump backwards from $I_2$ to $I_1$. Fast switching is performed in this fashion, and it is apparent that the variation in the oscillation condition depends on the delay in the variation of the laser light. The capacitance of the point contact electrode 45 is very small and hence it does not contribute to the change in the high frequency characteristics. However, the rise time of the laser oscillation is generally faster than $10^{-9}$ second, and the switching time of the negative resistance element according to the present invention may easily be made faster than $10^{-9}$ second.

It has been found that a fast switching or power amplification can be performed using the negative resistance in accordance with the present invention and the laser oscillation light as a medium. As an example, gallium arsenide containing tellurium in the amount of $1.5\times10^{17}$/cc. was used as the semiconductor. When a platinum rhodide deposit or gold deposit 44 with a small area was formed as shown in FIG. 4, and a battery source 47 of 20 volts and a 30,000 ohm load resistor 48 were connected, an exciting current of 2,000 A./cm.$^2$ flowed. The element must be immersed in liquid nitrogen during the operation. As the breakdown voltage of the contact was 17 volts, the first stable point was at the point 64 in FIG. 6 with the current and voltage as shown. When the source voltage was reduced to the voltage E′ in FIG. 6, the current in the element changed rapidly to the point 63 and the rise time was faster than $10^{-9}$ second. When the laser exciting current was increased, the voltage E′ approached the breakdown voltage, and the voltage difference between E and E′ was reduced, enabling switching with a small input voltage. When a small increase in the capacitance of the junction is not critical, the metal deposit may be formed on the entire face where the laser light is reflected, eliminating the complexity of adjusting the location of the electrode. Gold showed the most stable rectifying characteristics as the metal deposit in such an element.

It is apparent that the negative resistance element in accordance with the present invention can be used for amplification of an electric signal in a circuit as an active element, as in the case of the conventional negative resistance element. It was found effective in improving the electrical stability to so alloy the electrode at a relatively low temperature for a short period of time as to form a thin alloy layer.

The optical semiconductor device in accordance with the present invention has still another desirable performance characteristic. Namely, the device enables fast start of the laser oscillation with a fast rise time. FIG. 7, as FIG. 6, shows negative resistance characteristic curves for three different laser exciting current values. The curve 69 shows the negative resistance with a low laser exciting current near the threshold current. When the current is increased, the curve moves to 65 and 66. As is clear from FIG. 7, there is only one stable point 67 when the current is low and near the threshold value. If the current is increased so that the curve moves to 66, the stable point jumps to 68. The stable point, therefore, moves with increasing current, and it can be seen that the operating point moves to 67 through 66, when the characteristic curve which intersects 67 begins to show a negative resistance at the point 67. The voltage at the point 68 is significantly lower than that at the point 67, and the electrostriction factor is very small and the laser oscillation output is very high when the operating point is at the point 68.

FIG. 8 shows the relationship between the output light intensity and the exciting current of the laser oscillation of the device in accordance with the present invention. In this figure, the portion 70 of the curve is the relationship prior to the laser oscillation, the portion 71 shows that after the laser oscillation, the portion 72 indicates the rapid change in the intensity of the emerged light due to the rapid jump of the operating point as described above, and the portion 73 shows the relationship after the operating point has switched to the point 68 of FIG. 7. As is clear from FIG. 8, it is possible to vary the output light intensity rapidly, though the variation in the exciting current is slow. It is also possible to maintain the speed of the variation in the output light intensity faster than $10^{-9}$ second as in the aforementioned case. It will therefore be appreciated that laser light having a very fast rise time can be easily produced by employing the device according to the present invention.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An optical semiconductor amplifying device comprising a pair of semiconductor regions of like conductivity positioned on a semiconductor substrate of opposite conductivity with said pair of regions forming a pair of coplanar semiconductor junctions with the substrate, a pair of substantially parallel optically flat reflecting surfaces flanking the planar junctions to form a semiconductor laser junction, electrodes coupled to the regions and the substrate, a rectifying-barrier-forming electrode positioned on one of the reflecting surfaces in the laser path, means for producing a laser-inducing current across each of the junctions to provide respectively a light-generating and a light-amplifying junction for amplifying the laser light generated in the coplanar junction and means including a load resistor for producing a reverse current across the barrier junction and establish a varying voltage across the resistor in response to laser-induced variations of the reverse current.

2. The device as recited in claim 1 wherein the rectifying-barrier-forming electrode comprises a thin alloyed metallic layer, said layer being formed on at least one of the reflection faces.

3. An optical semiconductor device comprising:

a first semiconductor region of a first conductivity and a second semiconductor region of opposite conductivity in junction-forming relationship with the first region with said regions provided with a pair of substantially parallel optically flat reflecting surfaces flanking the junction to form a semiconductor laser junction, and a pair of current electrodes couples to the region for establishing laser-inducing currents across the junction and a rectifying-barrier-forming electrode positioned on one of the reflecting surfaces in the laser path.

4. The device as recited in claim 3 wherein the junction formed between the regions lies in a plane with the junction terminating short of the one reflecting surface having said barrier forming electrode to leave a portion of one of the semiconductor regions between the junction and the rectifying-barrier-forming electrode.

5. The device as recited in claim 4 wherein said one semiconductor region has a high anisotropic characteristic to respond with varying stresses in said region portion adjacent the rectifying-barrier-forming electrode in response to reverse biasing potentials applied across the rectifying-barrier-forming electrode.

6. The device as recited in claim 5 wherein the one region is formed of crystal material with the crystal orientation being preselected relative to an electric field formed across the rectifying barrier to obtain maximum electrostrictively induced stresses in the portion adjacent the barrier-forming electrode in response to reverse biasing potentials applied thereacross.

7. The device as recited in claim 6 wherein the one region is formed of gallium arsenide crystal having its crystal orientation so adjusted that the electric field formed across the barrier in response to a reverse biasing potential is in the 110 crystal orientation.

8. The device as recited in claim 7 wherein the gallium arsenide has tellurium of a preselected semiconductor-forming quantity and wherein said barrier-forming electrode is made of a material selected from the group consisting of platinum rhodide and gold.

9. The device as recited in claim 3 wherein the junction formed between the region lies in a plane intersecting the reflecting surfaces substantially transversely with the junction terminating short of intersection with the reflecting surfaces, with the rectifying-barrier-forming electrode formed in the one reflecting surface at the intersection of the plane, and a second rectifying-barrier-forming electrode located on the other reflecting surface at the intersection of the plane.

10. The device as recited in claim 3 wherein said rectifying-barrier-forming electrode is a metallic layer deposited on an entire reflecting surface.

11. The device as recited in claim 10 wherein the metallic layer is made of gold.

12. The device as recited in claim 3 wherein said rectifying-barrier-forming electrode is of the point contact type.

13. The device as recited in claim 3 wherein said rectifying-barrier-forming electrode is of the Schottky barrier-forming type.

14. An optical semiconductor controlled switch comprising:

a first semiconductor region of a first conductivity and a second semiconductor region of opposite conductivity in junction-forming relationship with the first region with said regions provided with a pair of substantially parallel optically flat reflecting surfaces flanking the junction to establish a semiconductor laser junction, a rectifying-barrier-forming electrode positioned on one of the reflecting surfaces in contact with one of the semiconductor regions in the laser path, means including a load resistor for reverse biasing said rectifying barrier formed between the electrode and the one semiconductor region and establish a reverse current through the barrier, means responsive to an input signal for producing a laser-inducing current across the junction for the control of reverse current flowing through the rectifying barrier in response to laser light incident on the barrier adjacent the electrode to vary the voltage developed across the load resistor by the reverse current.

15. The device for varying the intensity of an optical semiconductor laser comprising:

a first semiconductor region of a first conductivity and a second semiconductor region of opposite conductivity in junction-forming relationship with the first region with said regions provided with a pair of substantially parallel optically flat reflecting surfaces flanking the junction to establish a semiconductor laser junction, a rectifying-barrier-forming electrode positioned on one of the reflecting surfaces in contact with one of the semiconductor regions and positioned in the laser path, means for producing a laser inducing current of a preselected value across the junction to establish a laser intersecting the rectifying barrier adjacent the electrode, means for producing a controllable bias voltage across the rectifying barrier to vary the electrostrictive characteristics of the semiconductor region adjacent the electrode and control the laser intensity.

16. The device as recited in claim 15 wherein the bias-voltage-producing means includes a load resistor for limiting reverse current flow through the rectifying barrier and wherein said laser-current-producing means produces a current having a value selected to provide a pair of stable reverse current operating points for varying bias voltages and obtain a laser switching device.

References Cited

UNITED STATES PATENTS

| | | |
|---|---|---|
| 2,959,681 | 11/1960 | Noyce. |
| 3,175,929 | 3/1965 | Kleinman. |
| 3,200,259 | 8/1965 | Braunstein. |
| 3,305,685 | 2/1967 | Wang. |
| 3,354,406 | 11/1967 | Kiss. |

JOHN W. HUCKERT, Primary Examiner

R. F. POLISSACK, Assistant Examiner

U.S. Cl. X.R.

250—215, 216; 317—235, 236; 330—4.3; 331—94.5